(12) United States Patent
Murata

(10) Patent No.: US 6,506,452 B2
(45) Date of Patent: Jan. 14, 2003

(54) PROCESS FOR PRODUCING HONEYCOMB STRUCTURE

(75) Inventor: Masakazu Murata, Shinshiro (JP)

(73) Assignee: Denso Corporation, Aichi-Pref (JP)

( * ) Notice: Subject to any disclaimer, the term of this patent is extended or adjusted under 35 U.S.C. 154(b) by 0 days.

(21) Appl. No.: 09/729,912

(22) Filed: Dec. 6, 2000

(65) Prior Publication Data

US 2001/0038902 A1 Nov. 8, 2001

(30) Foreign Application Priority Data

Dec. 7, 1999 (JP) .......................... 11-347354
Nov. 28, 2000 (JP) ....................... 2000-361395

(51) Int. Cl.⁷ ............................... B05D 3/02
(52) U.S. Cl. ............. 427/376.1; 427/314; 427/376.2; 427/383.5
(58) Field of Search ................ 427/314, 376.1, 427/376.2, 383.5

(56) References Cited

U.S. PATENT DOCUMENTS 4,231,900 A * 11/1980 Kato et al. ............ 252/466 PT
5,275,771 A * 1/1994 Bush et al. ................ 264/63
5,346,722 A * 9/1994 Beauseigneur et al. ..... 427/300
6,242,072 B1 * 6/2001 Ueda et al. ............... 428/116

FOREIGN PATENT DOCUMENTS

JP 49-36596 A * 4/1974
JP 6-165939 6/1994

* cited by examiner

*Primary Examiner*—Michael Barr
(74) *Attorney, Agent, or Firm*—Nixon & Vanderhye

(57) ABSTRACT

A process for producing a honeycomb structure, comprising the steps of: providing a substrate having cell walls in a honeycomb form and comprising $SiO_2$, $Al_2O_3$ and MgO as the main chemical components, applying to said substrate a mixture of a component for lowering the cordierite crystal phase crystallization temperature of said substrate with a liquid medium, and firing said substrate with said mixture applied to form a honeycomb structure comprising a crystalline cordierite phase, said crystalline cordierite phase comprising 42–56% by mass of $SiO_2$ 30–42% by mass of $Al_2O_3$ and 12–18% by mass of MgO as the main chemical components.

5 Claims, 7 Drawing Sheets

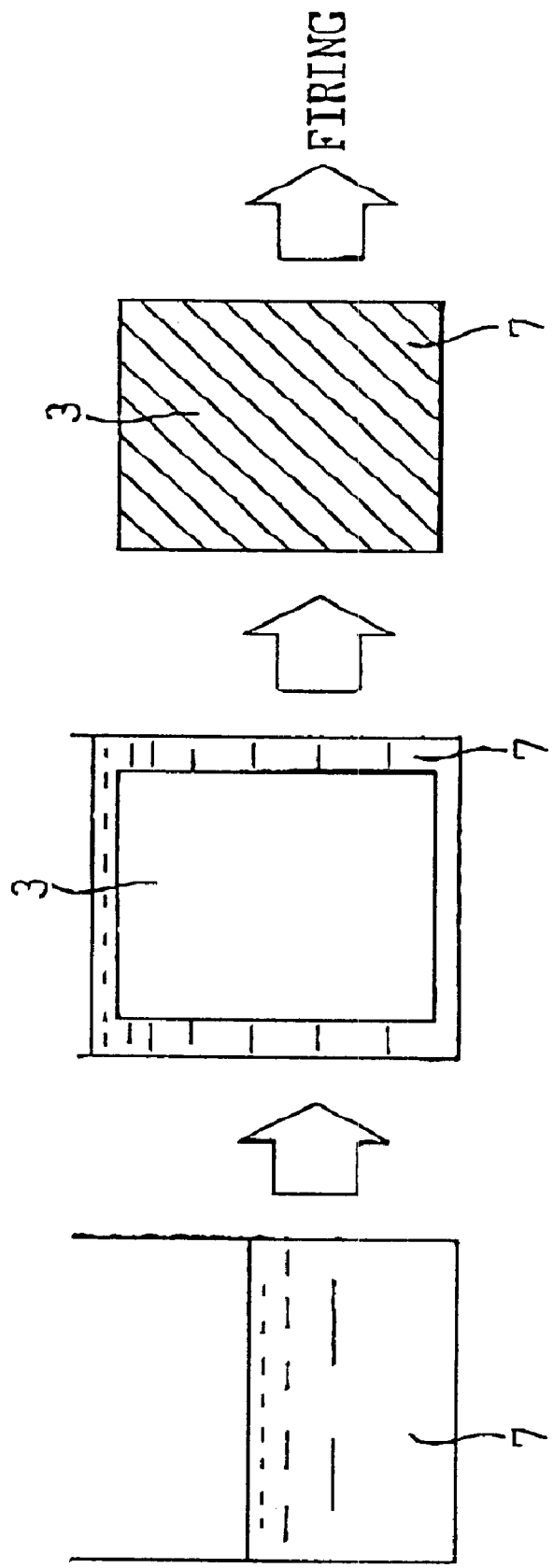

PROCESS FOR PRODUCING HONEYCOMB STRUCTURE

BACKGROUND OF THE INVENTION

1. Field of the Invention

The present invention relates to a process for producing a honeycomb structure, comprising mainly a cordierite crystalline phase, used as a catalyst support in an exhaust gas purifying device.

2. Description of the Related Art

A honeycomb structure, comprising mainly a cordierite crystalline phase, used as a catalyst support in an exhaust gas purifying device, is known (for example, Japanese Unexamined Patent Publication (Kokai) No. 6-165939).

In such a honeycomb structure, if the porosity of the structure is low, the compressive strength is high but the amount of catalyst supported is small. On the other hand, if the porosity of the substrate is high, the amount of catalyst supported is large but the compressive strength is low.

It is therefore difficult to make a honeycomb structure having a high compressive strength as well as able to support a large amount of catalyst.

The object of the present invention is to provide a process for producing a honeycomb structure having a high compressive strength as well as able to support a large amount of catalyst.

SUMMARY OF THE INVENTION

The above and other objects of the invention are attained by providing a process for producing a honeycomb structure, comprising the steps of: providing a substrate having cell walls in a honeycomb form and comprising $SiO_2$, $Al_2O_3$ and MgO as the main chemical components, applying to said substrate a mixture of a component for lowering the cordierite crystal phase crystallization temperature of said substrate with a liquid medium, and firing said substrate with said mixture applied to form a honeycomb structure comprising a crystalline cordierite phase, said crystalline cordierite phase comprising 42–56% by mass of $SiO_2$, 30–42% by mass of $Al_2O_3$ and 12–18% by mass of MgO as the main chemical.

DETAILED DESCRIPTION OF THE INVENTION

In accordance with the present invention, by applying said mixture of a component for lowering the crystallization temperature of cordierite crystal phase volume of pores having a pore size of 1 μm or less, which do not contribute to the catalyst support, in the honeycomb structure decreases, while the ratio in volume of pores having a pore size of 1 μm or more, which do contribute to the catalyst support, increases. As a result, by decreasing in the ratio of small pores and therefore the total porosity, the compressive strength of the honeycomb structure is increased, while the catalyst supporting capability does not decrease in comparison with the prior art since the ratio of large pores does not decrease.

The reasons for the above are not clear, but it is considered that since the crystallization temperature of cordierite near the surface of the cell walls of the substrate is lowered, the cordierite crystalline phase is formed during the firing step from the surface toward inside of the cell walls of the substrate and, in this gradual crystallization step, the small pores preferentially disappear in comparison with the large pores.

In the present invention, it is preferred that the firing temperature after the application of said mixture is close to a temperature for firing the substrate without the mixture applied. By the firing of the substrate with the applied mixture at the temperature at which the substrate without the mixture applied is to be fired, the small pores more effectively decrease. Here, the firing temperature" means the crystallization temperature and "the temperature close to the firing temperature" can be a temperature at which the substrate can be substantially fired or crystallized.

It is also preferred that the mixture is applied to 80% or more, more preferably 90% or more, of the total surface area of the cell walls of the substrate. By this application at such a large area of the surface of the cell walls of the substrate, the small pores can decrease over approximately the entire surface of the cell walls, by which it is possible that the strength of the fired structure increases and the catalyst supporting capability thereof is excellent.

It is also preferred that after said step of applying of said mixture, an excess portion of said mixture is removed from the surface of said substrate. By this removing step, the mixture can be appropriately uniformly applied or coated to the surface of the cell walls of the honeycomb structure, which is desired.

It is further preferred that the substrate to which the mixture is applied is a substrate which has not been fired yet and the medium of the applied mixture is a non-aqueous organic medium. In this process, since the substrate to which the mixture is applied and which is to be fired is a non-fired substrate, a desired honeycomb structure can be obtained simultaneously when said substrate is fired, i.e., by a single firing step.

The component for lowering the crystallization temperature of cordierite may be one or more of sources for the components constituting the cordierite, such as talc, alumina, kaolin, iron, titanium and mixtures thereof. Alternatively, components which become impurities in the cordierite, such as iron and titanium, can be used as said component for lowing the crystallization temperature of cordierite.

It is also preferred that a substrate having cell walls in a honeycomb form and comprising $SiO_2$, $Al_2O_3$ and MgO as the main chemical components is fired to form a fired substrate; a mixture of a component for lowering the cordierite crystal phase crystallization temperature of said fired substrate with a medium is applied to said fired substrate; and said fired substrate with said mixture is again fired to form a honeycomb structure comprising a crystalline cordierite phase, said crystalline cordierite phase comprising 42–56% by mass of $SiO_2$, 30–42% by mass of $Al_2O_3$ and 12–18% by mass of MgO as the main chemical components. In this process, a mixture of a component for lowering the crystallization temperature of cordierite crystal phase with a medium is introduced in small pores of cell walls of a once-fired substrate, and the substrate is then fired, by which the small pores decrease. In this process, since the substrate, to which a mixture of a component for lowering the crystallization temperature of cordierite crystal phase with a liquid medium is to be applied, is a once-fired substrate, the substrate is stable and therefore the application of the mixture is easy.

BRIEF DESCRIPTION OF THE DRAWINGS

FIGS. 3A to 3C show a process of producing a honeycomb structure in Example 1;

EXAMPLES

Example 1 and Comparative Example 1

FIGS. 1A–5 are referred to.

Figure 1A:
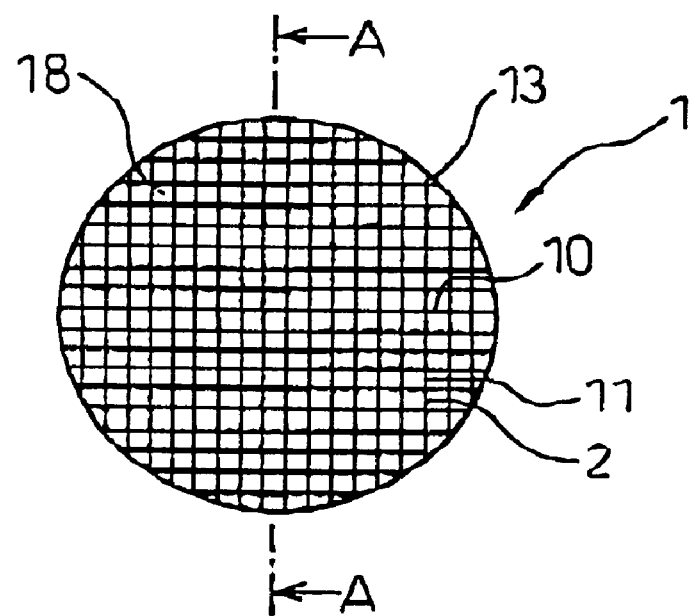
FIGS. 1A and 1B are front and side views of a honeycomb structure in Example 1.

A honeycomb structure mainly comprising a cordierite, as shown in FIG. 1A, was formed in Example 1. The honeycomb structure 1 was cylindrical and had a peripheral wall 13 in which cell walls 10 were provided in the form of honeycomb. The cell walls 10 had a thickness of about 100 μm and the cells 18 were rectangular having each side about 1.27 mm long.

Figure 1B:
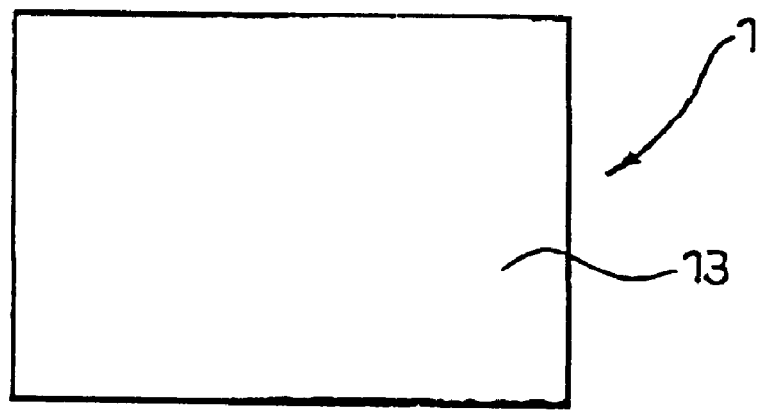

FIG. 1B shows the side view of the honeycomb structure 1.

Figure 2:
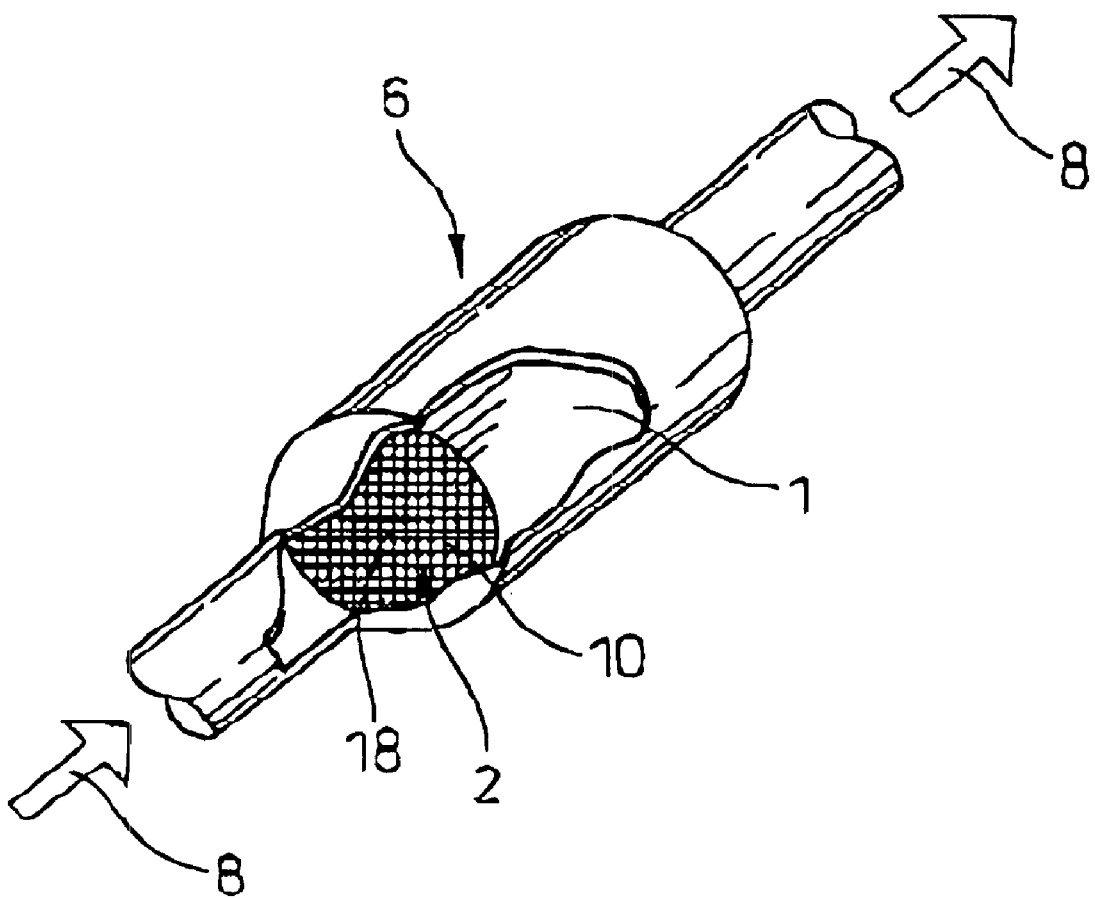
FIG. 2 shows an exhaust gas purification device in which a honeycomb structure in Example 1 is set.

As shown in FIG. 2, the honeycomb structure 1 on which a catalyst is supported is arranged in an exhaust gas purifying device 6, in which exhaust gas 8 passes through the cells 18 formed by the cell walls 10 in the honeycomb structure 1.

In the production of this honeycomb structure 1, a starting material was prepared by adjusting the composition ratio, the particle size and so on of talc, kaolin, calcined kaolin and alumina so as to form a cordierite crystalline phase by firing. This starting material was extruded through a die (not shown in figures but known) and the extruded body was dried to form a honeycomb substrate 3.

As shown in FIG. 3A, a mixture 7 of a liquid phase was previously prepared from 25% by mass of talc, as a component for lowing the crystallization temperature of cordierite, and 75% by mass of a non-aqueous organic solvent such as petroleum-based hydrocarbons. The talc may be changed to another cordierite-constituting component or an impurity of the cordierite.

Next, as shown in FIG. 3B, the substrate 3 was immersed almost entirely in the mixture liquid 7 to apply or coat the mixture to about 95% of the total surface area of the cell walls constituting the substrate 3.

The reason why the mixture 7 was applied or coated to only about 95% of the total surface area of the cell walls constituting the substrate 3 is that even when the substrate 3 was entirely immersed in the mixture liquid 7, air bubbles could not be removed completely from the substrate 3. It is of course desired that the mixture 7 could be applied to about 100% of the total surface area of the cell walls constituting the substrate 3, if possible. However, even application of the mixture to about 80% or more, more preferably 90% or more of the total surface area of the cell walls constituting the substrate 3 provides a sufficient strength.

As a result of the immersion of the substrate 3 in the mixture liquid 7, the mixture liquid 7 was applied to approximately all the surface of the cell walls of the substrate 3, as shown in FIG. 3C.

The excess mixture liquid was removed from the cell walls 30 by air pressure or suction.

By applying the mixture liquid 7 to the substrate 3, the honeycomb structure after firing mainly comprised a cordierite phase consisting of 51% by mass of $SiO_2$, 33% by mass of $Al_2O_3$ and 16% by mass of MgO, while the substrate without the application of the mixture liquid should provide as the main component a cordierite phase consisting of 50% by mass of $SiO_2$, 36% by mass of $Al_2O_3$ and 14% by mass of MgO by firing. This means that the cordierite crystallization temperature was lowered from 1460° C. prior to the application of the mixture liquid to 1430° C. after the application of the mixture liquid.

The substrate 3 whose cordierite crystallization temperature was lowered, was fired for 4 hours at 1400° C. which is the same as the firing temperature of the substrate 3 without the applied mixture liquid.

Figure 4A:
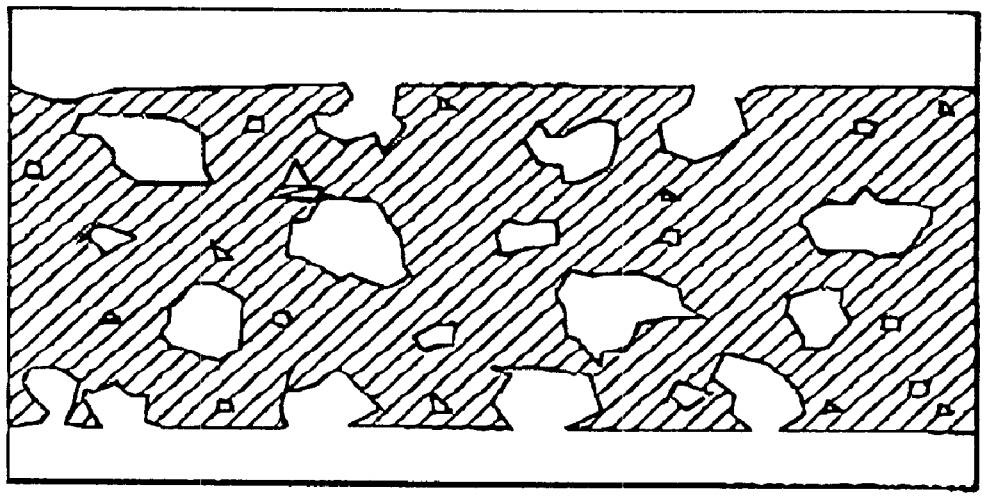
FIGS. 4A and 4B are enlarged views of cell walls of a conventional honeycomb structure and a honeycomb structure in Example 1, respectively.
Figure 4B:
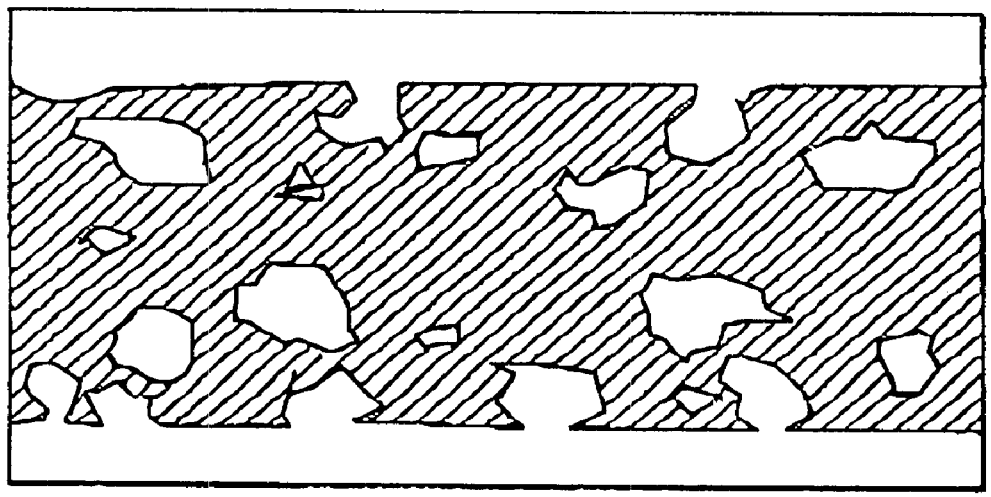

FIG. 4A schematically shows an enlarged sectional view of a cell wall of a conventional substrate fired without application of the mixture liquid and FIG. 4B schematically shows an enlarged sectional view of a cell wall of the substrate fired after the application of the mixture liquid as above. It is seen that small pores decrease in FIG. 4B in comparison with FIG. 4A.

Figure 5:
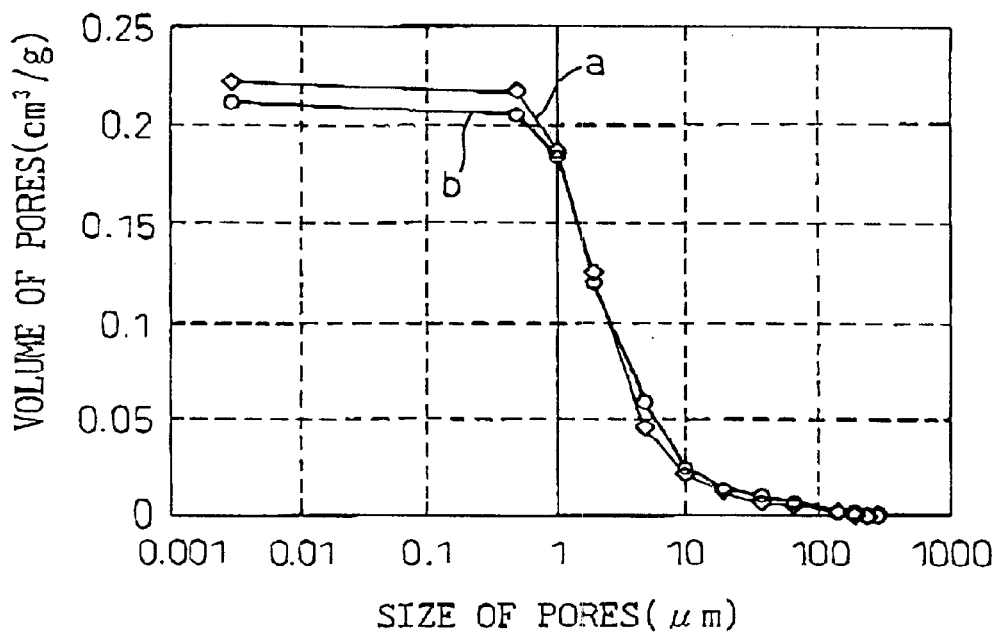
FIG. 5 shows the relationship between the pore size and the pore volume of a conventional honeycomb structure and a honeycomb structure in Example 1.

FIG. 5 shows the relationship between pore size and pore volume of the pores in the cell walls of the substrates of the prior art and the present invention. In FIG. 5, the line a shows that of the prior art and the line b shows that of the present invention.

From FIGS. 4A, 4B and 5, it is seen that by lowering the cordierite crystallization temperature of the cell walls 10, only small pores having a pore size of 1 μm or less, which do not contribute to the catalyst support, can substantially decrease in the cell walls of the honeycomb structure, in comparison with the cell walls of the conventional honeycomb structure.

As a result, the porosity of the cell walls of this Example decreased to 25% by a decrease in the small pores from 35% of the porosity which was obtained when the mixture liquid was not applied, by which the strength of the cell walls of the honeycomb structure increased. Also, the amount of the catalyst supported was maintained or not decreased, because a decrease in the large pores was substantially prevented.

Figure 6:
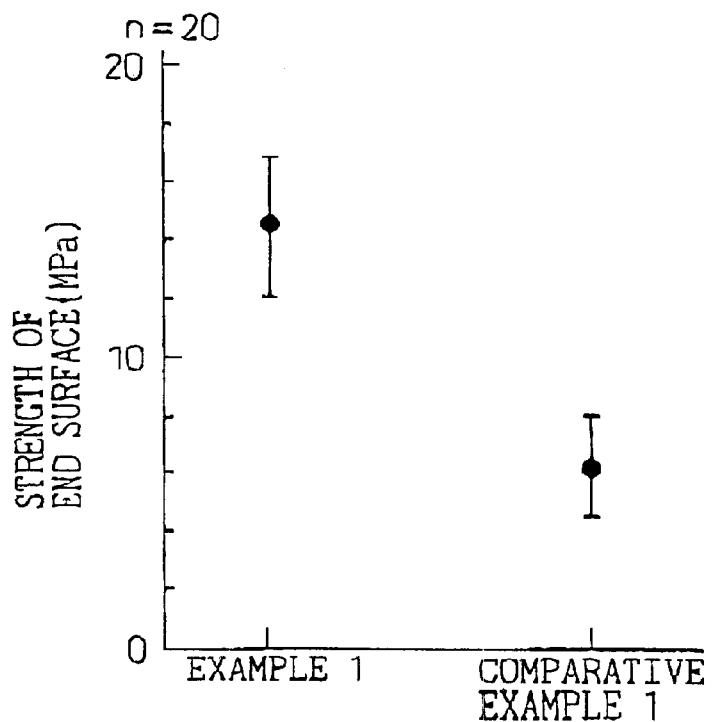
FIG. 6 shows the compared strength at the end of a honeycomb structure between a conventional honeycomb structure and a honeycomb structure in Example 1.
Figure 7:
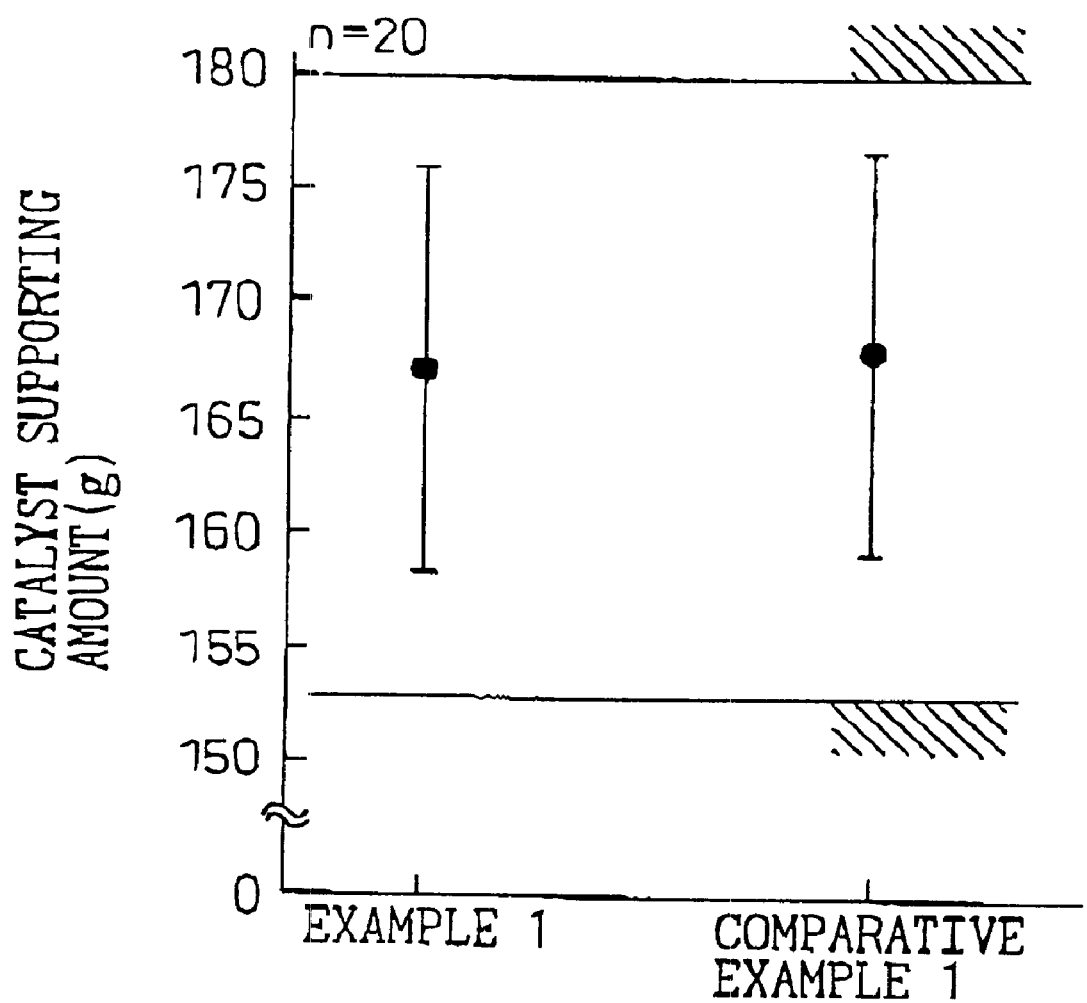
FIG. 7 shows the compared amount of catalyst supported on a honeycomb structure between a conventional honeycomb structure and a honeycomb structure in Example 1.

The strength of the end surface of the honeycomb structure and the amount of the catalyst supported of this Example 1 and Comparative Example 1 were measured and are shown in FIGS. 6 and 7. Here, the honeycomb structure measured had a cylindrical shape with a diameter of 103 mm and a length of 105 mm and had 900 mesh-cells with a cell wall thickness of about 50 μm. The strength of the end surface of the honeycomb structure was measured by applying a 10 mm-diameter pin to the end surface of the honeycomb structure, increasing the pressure of the pin toward the end surface of the honeycomb structure, determining the load when the end surface of the honeycomb structure was damaged or cracked, and dividing the measured load by the surface area of the 10 mm-diameter pin to obtain the strength of the end surface in MPa.

It is seen from FIGS. 6 and 7 that the honeycomb structure of Example 1 had an improved end surface strength while the amount of the catalyst supported was maintained, in comparison with Comparative Example 2.

Example 2

Figure 8:
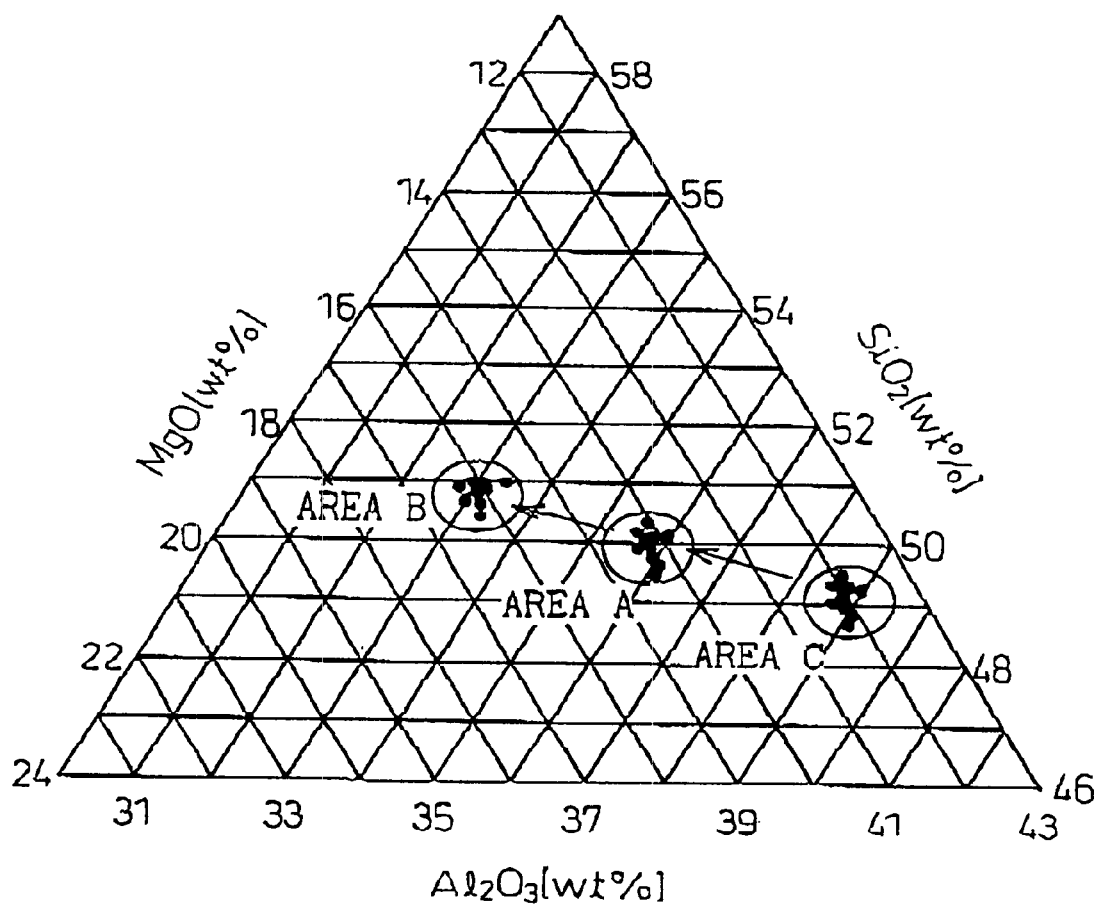
FIG. 8 is a compositional diagram showing the cordierite composition of a honeycomb structure when the honeycomb structure is fired with or without a mixture liquid applied.

When FIG. 8 is referred to, in Example 1, the honeycomb structure 3 had a cordierite composition as indicated by the region A in FIG. 8, typically 50% by mass of $SiO_2$, 36% by mass of $Al_2O_3$ and 14% by mass of MgO, when the mixture liquid was not applied and the structure was fired, but it was changed by the application of the mixture liquid followed by firing to the region B in FIG. 8, typically 51% by mass of $SiO_2$, 33% by mass of $Al_2O_3$ and 16% by mass of MgO.

However, the composition in the region B has a thermal expansion coefficient higher than that of the composition in the region A, resulting in that the fired honeycomb structure with the composition in the region B may have an inferior thermal shock resistance.

Considering the above, in Example 2, the honeycomb structure 3 used a cordierite composition as indicated by the region C in FIG. 8, typically 49% by mass of $SiO_2$, 39% by mass of $Al_2O_3$ and 12% by mass of MgO, when the structure was fired without application of the mixture liquid, and the composition of the honeycomb structure 3 after firing was changed by the application of the mixture liquid to the region A in FIG. 8, typically 50% by mass of $SiO_2$, 36% by mass of $Al_2O_3$ and 14% by mass of MgO.

In this case, since the composition of the starting material is controlled such that the honeycomb structure when the mixture liquid is applied and fired has the same cordierite composition as that of the conventional honeycomb structure, not only the porosity decrease and the amount of the catalyst supported is maintained but also increase in the thermal expansion coefficient is prevented, in the obtained honeycomb structure.

Although the mixture liquid was applied to a substrate which had not been fired in Examples 1 and 2, the present invention is not limited thereto. For example, a mixture liquid may be applied to a fired honeycomb substrate and the substrate be fired again after a mixture liquid is applied. In this case, it is preferred that the mixture liquid is a mixture of a melting-point-lowering component such as talc with a binder and water.

Figure 9:
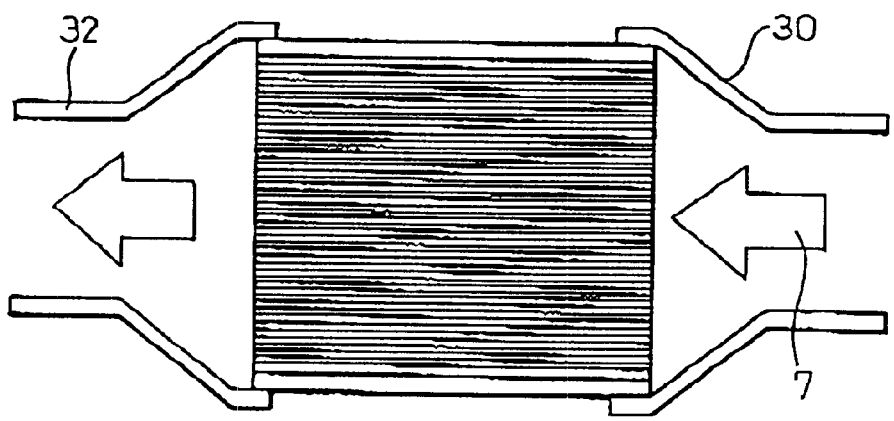
FIG. 9 shows another process of producing a honeycomb structure.

In Examples 1 and 2, the honeycomb structure as a whole was immersed in a mixture liquid followed by removing an excess mixture liquid to apply or coat the mixture liquid to the honeycomb structure as shown in FIGS. 3A to 3C, the present invention is not limited thereto. For example, as shown in FIG. 9, a member 30 for introducing a mixture liquid and a member 32 for discharging a mixture liquid are provided to one and other ends of a honeycomb structure, respectively, and a mixture liquid 7 flows through the honeycomb structure, followed by removing an excess mixture liquid from the honeycomb structure, to apply or coat the mixture liquid onto the honeycomb structure.

What is claimed is:

1. A process, for producing a honeycomb structure, comprising the steps of:

providing a substrate having cell walls in a honeycomb form and comprising $SiO_2$, $Al_2O_3$ and MgO as the main chemical components, applying to 80% or more of the total surface area of the cell walls of said substrate a mixture of talc with a liquid medium, and firing said substrate with said mixture applied to form a honeycomb structure comprising a crystalline cordierite phase, said crystalline cordierite phase comprising 42–56% by mass of $SiO_2$, 30–42% by mass of $Al_2O_3$ and 12–18% by mass of MgO as the main chemical components.

2. The process according to claim 1, wherein said mixture is applied to 90% or more of the total surface area of the cell walls of said substrate.

3. The process according to claim 1, further comprising the step of removing an excess portion of said mixture from the surface of said cell walls of said substrate after said step of application of said mixture.

4. The process according to claim 1, wherein said substrate prior to said application of said mixture is a substrate which has not been fired, and said liquid medium of said mixture is a non-aqueous organic medium.

5. A process for producing a honeycomb structure, comprising the steps of:

firing a substrate having cell walls in a honeycomb form and comprising $SiO_2$, $Al_2O_3$ and MgO as the main chemical components to form a fired substrate, applying to 80% or more of the total surface area of the cell walls of said fired substrate a mixture of talc with a liquid medium, and then firing said fired substrate with said mixture applied, to form a honeycomb structure comprising a crystalline cordierite phase, said crystalline cordierite phase comprising 42–56% by mass of $SiO_2$, 30–42% by mass of $Al_2O_3$ and 12–18% by mass of MgO as the main chemical components.

* * * * *